Oct. 19, 1943.    J. J. BOUCHAL    2,332,295
DRILL
Filed Nov. 7, 1941

INVENTOR
J. J. BOUCHAL
BY
E. B. Moulan
ATTORNEY

Patented Oct. 19, 1943

2,332,295

UNITED STATES PATENT OFFICE 2,332,295

DRILL

Jerry J. Bouchal, Westfield, N. J., assignor to Western Electric Company, Incorporated, New York, N. Y., a corporation of New York Application November 7, 1941, Serial No. 418,137

4 Claims. (Cl. 145—116)

This invention relates to drills, and more particularly to wood drills of the power driven type.

Wood drills of the conventional type having spurs determining the diameters of the holes they are adapted to cut, require considerable care in handling as well as in service to avoid dulling the spurs and other cutting edges. For example, when drills of this type are used with drill fixtures they must be accurately aligned with the bushings of the drill fixture, otherwise the spurs striking the bushings will be dulled, requiring a special sharpening process that could not be performed on the conventional bench grinder.

An object of the invention is to provide a drill of the woodworking type which is simple in structure, not easily dulled, self-aligned in use with a drill fixture, and easily sharpened.

With this and other objects in view, the invention comprises a drill of the woodworking type having a body with a spiral portion the forward end of which is bevelled, providing inwardly tapered cutting edges with companion cutting edges extending angularly inwardly to a center point, the cutting edges all having following relief portions of definite dimensions.

Other objects and advantages will be apparent from the following detailed description when taken in conjunction with the accompanying drawing, wherein Fig. 1 is an elevational view of the drill;

Figure 1:
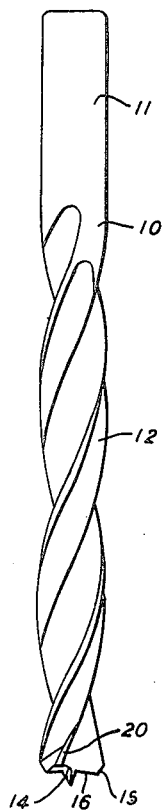

Referring now to the drawing, attention is first directed to Fig. 1, which illustrates the drill having a body 10, the upper end of which is circular in cross section, as indicated at 11, to be received in a chuck of a drill press of any suitable type. The remainder of the body 10 in general is of spiral formation, as indicated at 12.

Figure 2:
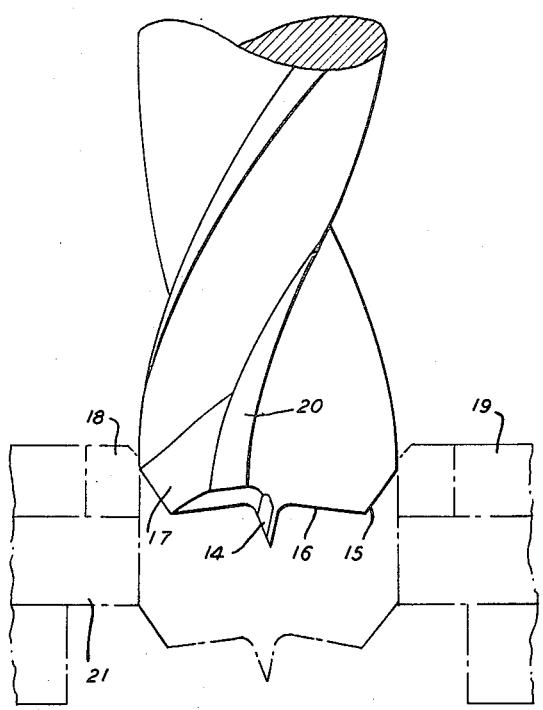
Fig. 2 is an enlarged fragmentary view illustrating the contours adjacent the cutting end and their relationship with respect to a bushing of a drill fixture.
Figure 4:
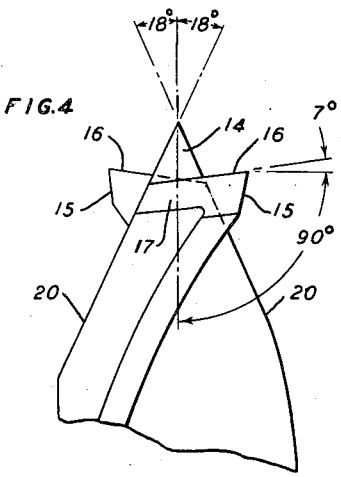
Fig. 4 is a fragmentary detailed view taken substantially along the line 4—4 of Fig. 3.
Figure 3:
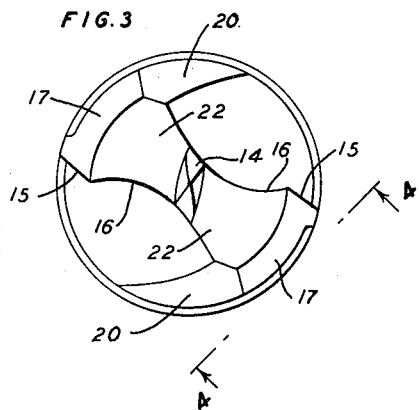
Fig. 3 is an enlarged end elevational view of the drill.

Attention is now directed to Figs. 2 and 3, which illustrate a center point 14, outer cutting edges 15 and inner cutting edges 16. The outer cutting edges 15 and their relief portions 17 extend inwardly toward an extended center line of the drill, providing a bevelled end for the drill which serves as a guide for the alignment of the drill with a bushing 18 of a drill fixture 19. The bushing of the drill fixture has been selected for the purpose of illustration but it should be understood that the bevelled end will guide the drill into any selected apertured object or fixture. The relief portions 17 although arcuate in contour, extend inwardly a slight distance, preferably seven degrees (Fig. 4), from their respective cutting edges 15, maintaining their bevelled formation yet relieving the cutting edges to assure accurate cutting of the drill into work 21 without splintering or chipping the work. To further assist in the aligning of the drill with the bushing 18, each side of the spiral structure 12 is cut back as at 20, the surfaces of the portions 20 lying at like angles from the center line of the drill, these angles being preferably approximately eighteen degrees as indicated in Fig. 4, these cutaway portions also positioned in planes with adjacent surfaces of the center point 14, as illustrated in Fig. 4. The portions 20 are the following portions of the spiral portions, the cutting edges 15 extending from the leading portions thereof. Furthermore, due to the angular relationship of the portions 20 with the center line of the drill, they will assist the relief portions 17 in aligning the drill with the bushing 18. Although the portions 20 will engage the bushing after the latter is engaged by the portion 17, both sets of portions function in aligning the drill with the bushing.

The cutting edges 16 are arcuate in contour, observing the end view of Fig. 3, to create a shearing effect on the work when the drill is in use. The cutting edges 16 also extend inwardly toward the base of the point 14 at angles greater than right angles with respect to the center line of the drill and at angles greater than right angles with respect to the cutting edges 15. This relationship of the cutting edges also assures what might be termed cleaned cuts in the work, eliminating splintering or chipping of the work and eliminating the leaving of a button on the end of the drill when the drill has completed the hole in the work. Each cutting edge 16 has a relief portion 22, extending inwardly at like angles, preferably at angles approximately seven degrees, from a plane at right angles to the center line of the drill.

As previously described, the drill is of the woodworking type, meaning that it may be used for drilling holes in materials other than metal or similar structures. Although the drill is particularly designed for woodworking it is apparent that the drill could be used for other fibrous materials or plastics. Furthermore, although the drill was particularly adapted for use with drill presses it could be readily used with hand drills if desired.

The important advantages of the structure of the drill are, first, that the drill with the relatively positioned cutting edges 15 and 16 will accurately cut into work without splintering or flaking the material of the work and without leaving the commonly known buttons on the end of the drill. The contour of the point 14 facilitates in this last named advantage, the tapered edges of the point providing no holding means for the remaining material or button but providing smooth tapered surfaces so that the button may freely drop therefrom. Second, each cutting edge is provided with accurate relief surfaces. Third, the relief surfaces 17 form a tapered end for the drill, serving to guide the drill into the drill bushing if there should not be accurate alignment thereof. Fourth, the conventional spurs common on wood drills have been eliminated, using in their stead the cooperation of the cutting edges 15 and 16 the vertices of which serve with the point 14 in directing the drill in a straight line through the work and assuring the cutting of a hole of the exact diameter of the drill. This is difficult and ofttimes impossible with drills of the spur type. As a matter of fact, the cooperating cutting edges 15 and 16 are so efficient in directing the drill in a straight line and eliminating lateral travel of the drill that such a result would be accomplished if the center point should be off center. Fifth, the drill with the elimination of the conventional spurs may be readily sharpened on a bench grinder without the necessity of the special grinding apparatus necessary for spur type drills. Sixth, with the elimination of the spurs, which are easily dulled if brought in contact with the drill bushing, and with the provision of the bevelled surfaces serving to eliminate dulling of the drill and aiding in the aligning of the drill with the bushing, the drill is assured of longer life between sharpening processes than the drill of the spur type. Seventh, the angles and contours of the cutting edges 15 and 16 bring about a shearing of the material rather than a straight cut, resulting in a cleaner hole free of splintered or chipped portions. The contour of the cutting edges 16 in Fig. 3 is illustrated and has previously been described as arcuate, obviously forming a shearing cut in the work. The cutting edges 15 of this figure are also illustrated as extending at angles so that a shearing action on the work will be created. Eighth, the contours of the cutaway portions 20 cooperate with the adjacent surfaces of the point 14 cooperating with the bevelled portions, namely the relief portions 17, in aligning the drill with its bushing.

The embodiment of the invention herein disclosed is merely illustrative and may be widely modified and departed from in many ways without departing from the spirit and scope of the invention as pointed out in and limited solely by the appended claims.

What is claimed is:

1. A drill comprising a body having a mounting end and a cutting end with an intermediate spiral portion extending to the cutting end and having leading edges and following edges, cutting edges extending at like angles from the leading edges of the spiral portion in a direction away from the mounting end and toward the center of the body, a center point disposed at the center line of the body and having converging flat surfaces lying in different planes, and tapered surfaces formed at the following edges and lying respectively in certain of the said planes.

2. A drill comprising a body having a mounting end and a cutting end with an intermediate spiral portion extending to the cutting end and having leading edges and following edges, a center point disposed at the center line of the body and having converging flat surfaces lying in different planes, pairs of cutting edges, one extending at like angles from the leading edges and away from the mounting end, and the other extending at like angles from the inner extremities of the first pair toward the mounting end and to the base of the center point, and tapered surfaces formed at the following edges and lying respectively in certain of the said planes.

3. A drill comprising a body having a mounting end and a cutting end with an intermediate spiral portion extending to the cutting end and having leading edges and following edges, cutting edges extending at like angles from the leading edges of the spiral portion, a center point disposed at the center line of the body and having converging flat surfaces lying in planes approximately 18° from the center line, and tapered surfaces formed at the following edges and lying respectively in certain of the said planes.

4. A drill comprising a body having a mounting end and a cutting end with an intermediate spiral portion extending to the cutting end and having leading edges and following edges, a center point disposed at the center line of the body and having outwardly converging flat surfaces lying in different planes, pairs of cutting edges, one extending at like angles from the leading edges and away from the mounting end, and the other extending at like angles from the inner extremities of the first pair toward the mounting end and to the base of the center point, tapered surfaces formed at the following edges and lying respectively in the planes of an opposed pair of said flat surfaces, and bevelled relief surfaces for the first mentioned pair of cutting edges extending at similar angles from the periphery of the spiral portion.

JERRY J. BOUCHAL.